United States Patent
Gupta et al.

(10) Patent No.: US 10,392,252 B2
(45) Date of Patent: Aug. 27, 2019

(54) METHOD AND APPARATUS FOR HIGH MASS CONCENTRATION NANO PARTICLE GENERATION

(71) Applicant: Battelle Memorial Institute, Columbus, OH (US)

(72) Inventors: Amit Gupta, Richland, WA (US); William C. Forsythe, Kennewick, WA (US); Mark L. Clark, Kennewick, WA (US)

(73) Assignee: Battelle Memorial Institute, Columbus, OH (US)

( * ) Notice: Subject to any disclaimer, the term of this patent is extended or adjusted under 35 U.S.C. 154(b) by 0 days.

(21) Appl. No.: 15/805,022

(22) Filed: Nov. 6, 2017

(65) Prior Publication Data

US 2018/0065853 A1 Mar. 8, 2018

Related U.S. Application Data

(62) Division of application No. 12/281,057, filed as application No. PCT/US2007/005499 on Mar. 2, 2007, now Pat. No. 9,845,242.

(60) Provisional application No. 60/779,119, filed on Mar. 3, 2006, provisional application No. 60/837,057, filed on Aug. 10, 2006.

(51) Int. Cl.
| | |
|---|---|
| *A61K 9/12* | (2006.01) |
| *C01B 32/05* | (2017.01) |
| *B82Y 30/00* | (2011.01) |
| *B82Y 40/00* | (2011.01) |
| *C01G 23/047* | (2006.01) |
| *C01B 32/15* | (2017.01) |

(52) U.S. Cl.
CPC .............. *C01B 32/05* (2017.08); *B82Y 30/00* (2013.01); *B82Y 40/00* (2013.01); *C01B 32/15* (2017.08); *C01G 23/047* (2013.01); *C01P 2002/72* (2013.01); *C01P 2002/82* (2013.01); *C01P 2002/85* (2013.01); *C01P 2004/04* (2013.01); *C01P 2004/52* (2013.01); *C01P 2004/64* (2013.01)

(58) Field of Classification Search
CPC combination set(s) only.
See application file for complete search history.

(56) References Cited

U.S. PATENT DOCUMENTS

| | | |
|---|---|---|
| 2005/0287308 A1 | 12/2005 | Becker et al. |
| 2006/0024435 A1 | 2/2006 | Holunga et al. |
| 2009/0317937 A1 | 12/2009 | Gupta et al. |

FOREIGN PATENT DOCUMENTS

| | | |
|---|---|---|
| SU | 1161164 | 6/1985 |
| WO | 2002093246 A1 | 11/2002 |
| WO | 2002100378 A1 | 12/2002 |
| WO | 2004056461 A | 7/2004 |

OTHER PUBLICATIONS

Official Action from EP Application No. 07 752 214.2-1354 dated Nov. 19, 2014.
International Preliminary Examination Report on Patentability issued in International Application No. PCT/US2007/005499 dated Sep. 9, 2008.
Eerikainen H et al; "Aerosol flow reactor method for synthesis of drug nanoparticles", European Journal of Pharmaceutics and Biopharmaceuticals, Elvesier Science Publishers, B.V. Amsterdam, NL, vol. 55, No. 3 May 2003 (May 2003) pp. 357-360.
Joutsensaari, J., et al., "Generation of nanophase fullerene particles via aerosol routes". Synthetic Metals, vol. 77, 1996, p. 85-88.

*Primary Examiner* — Hasan S Ahmed
(74) *Attorney, Agent, or Firm* — Frank Rosenberg

(57) ABSTRACT

A method and apparatus for generating nano particles, including but not limited to nano particles of Ceo, at high concentration. The invention uses a solid aerosol disperser in communication with a furnace tube having a vaporization chamber and a dilution chamber. A heating element surrounds the furnace tube. Heat from the heating element heats bulk materials contained within a gas flow in the vaporization chamber to a temperature sufficient to convert the bulk materials to a vapor phase. Vaporized bulk materials are then moved to a dilution chamber, where an inert gas is introduced through a dilution gas port. The flow of the inert gas into the dilution chamber through the dilution gas port is sufficient to eject the bulk material from the exit of the dilution chamber, thereby condensing the bulk material into nano sized particles in a gas flow of sufficient volume to prevent agglomeration of the nano sized particles.

6 Claims, 20 Drawing Sheets

METHOD AND APPARATUS FOR HIGH MASS CONCENTRATION NANO PARTICLE GENERATION

RELATED APPLICATIONS

This invention application is a divisional of U.S. patent application Ser. No. 12/281,057, filed Aug. 11, 2009, now U.S. Pat. No. 9,845,242, which claims priority to PCT patent application PCT/US2007/005499 which claims priority to, and incorporates by reference, the entire contents of U.S. Provisional Application No. 60/779,119, filed Mar. 3, 2006 and U.S. Provisional Application No. 60/837,057, filed Aug. 10, 2006.

TECHNICAL FIELD

This invention relates to methods and apparatus for generating nano-sized particles. In this form, these materials are suitable for use in applications requiring high concentration and high purity, including, but not limited to, inhalation toxicology studies, manufacturing applications, occupational safety and health studies, and as drug delivery systems. The invention is particularly well suited and enables the generation of high concentrations of nano-sized particles of $C_{60}$ aerosols.

BACKGROUND OF THE INVENTION

Despite the fact that many different nano scale materials are already in use in consumer products, the ability to determine the specific toxicity of many of these materials is still limited when compared to other materials. For example, the initial discovery of Buckminster fullerene, $C_{60}$ (commonly called bucky balls), described in Kroto H. W., Heath J. R., O'Brien S. C., Curl R. F. and Smally R. E. (1985). *Nature* 318 162, stimulated a great deal of research. However, much of the work related to aerosol generation of bucky balls (the form typically used for toxicity studies) was directed towards characterizing various properties such as phase, crystallinity, reactivity, geometry, physical and chemical properties. Such studies include, for example, that described in David E. Mccready and Mikhail S. Alnajjar (1993). "Powder data for Buckminster fullerene, $C_{60}$" *Powder Diffraction.* 9(2) June 1994. Some of the previous studies to generate $C_{60}$ aerosols include nebulizing a solution of $C_{60}$ in toluene and subsequent vaporization and condensation of the aerosol stream to break the huge aggregates. One such study is described in J. Jouttsensaari, P. Ahonen, U. Tapper, E. I. Kauppinen, J. Laurila and V. T. Kuokkala "Generation of nano phase fullerene particles via aerosol routes" *Synthetic Metals* 77 (1996) 85-88. Such approaches are generally undesirable for generating aerosols for inhalation studies, as the toluene contained within the aerosolized materials is incompatible with inhalation studies.

Despite limited study of the toxicity of these nano scale materials, there are several specific reasons that support the suspicion that toxicity may peculiar to nano scale materials. For example, in Kreuter, J. 2001 "Nanoparticulate systems for brain delivery of drugs" *Adv Drug Delivery Rev* 47:65-81, it was shown that nano materials can access regions of the body that are not open to larger particles, and that there is evidence that nano particles will be capable of crossing the blood-brain barrier, and leaking out of capillaries. Nano scale materials may enter via mechanisms that are distinct from larger particles and may escape common clearance pathways for particulate matter. Also, nano materials have a very high surface to volume ratios; their high surface-free energy leads to facile adsorption of molecular contaminants, offering a potential route for such molecular contaminants into regions of the body not normally accessible. Accordingly, as will be appreciated by those having ordinary skill in the art, methods and apparatus suitable for generating nano-sized particles would thus be useful not only for inhalation studies, but also for any application where these nano-sized particles, and substances contained within them or chemically bonded to them, are introduced into regions of the body not readily accessible by other means. Accordingly, there is a need in the art for methods and apparatus suitable for generating nano-sized particles.

SUMMARY OF THE INVENTION

One object of this invention is to provide a method and apparatus for generating nano particles at high concentration. It is another object of the present invention to provide a method for generating nano particles of Buckminster fullerene, $C_{60}$ at high concentration in a gas flow suitable for inhalation toxicology studies.

These and other objects and advantages are accomplished by providing an apparatus for generating nano particles at high concentration. The apparatus of the present invention begins with the use of a solid aerosol disperser. As used herein, the term "solid aerosol disperser" refers to any apparatus which provides a flow of solid particles in a gaseous flow. Accordingly, solid air dispersers suitable for use with the present invention are currently available from a variety of vendors. For example, and not meant to be limiting, a Model 3433 Small Scale Powder Disperser available from TSI, Inc. may be used alone or in conjunction with a TROST™ Gem T mill, available from Plastomer Technologies, to generate a flow of particles in a gaseous stream. Battelle Memorial Institute (Columbus, Ohio), assignee of the present invention, also has available a solid aerosol disperser that is commercially available, and is particularly well suited to the practice of the present invention.

While these commercially available solid aerosol dispersers can be configured to provide a flow of solid particles in a gaseous flow, the particle size of their output is not sufficiently small to meet the objectives of the present invention. For example, and not meant to be limiting, beginning by milling commercially available bulk material consisting of $C_{60}$ particles supplied by SES Research, Houston, Tex., the solid aerosol disperser available from Battelle Memorial Institute (Columbus, Ohio), can then provide a constant flow of $C_{60}$ having particles sized between about 1 µm and about 1.5 µm mass median aerodynamic diameter (MMAD) in a flow of nitrogen of about 6-6.5 LPM. The present invention thus provides a method whereby those particles are reduced further in size while maintaining purity, such that the resulting particles are of less than 100 nm count median diameter (CMD) and do not exhibit chemical decomposition of $C_{60}$ to an amorphous phase or to carbon black. Accordingly, the "nano sized particles" produced by the present invention are defined herein as particles having less than 100 nm count median diameter (CMD).

While the solid aerosol disperser available from Battelle Memorial Institute is preferred, those having ordinary skill in the art and the benefit of this disclosure will readily appreciate that any solid aerosol disperser which provides a flow of solid particles between about 1 µm and about 1.5 µm mass median aerodynamic diameter (MMAD) in a gaseous flow is suitable for use in the present invention. Accordingly, the present invention should not be viewed as limited to the solid aerosol disperser provided by any particular vendor.

Whatever the source of the bulk material, to form the nano sized particles, the present invention places some or all of the output of the solid aerosol disperser in communication with the input of the vaporization chamber of a furnace tube. A heating element is in proximity, and preferably surrounds, the vaporization chamber, which is kept at a temperature sufficient to heat the bulk materials within the furnace tube to a temperature sufficient to convert the bulk materials to the vapor phase. Other means of providing heating to the furnace to the levels described herein are possible, whether through direct conduction, radiant heating, a heating element, or other means whereby energy is conveyed to material in the furnace.

Vaporized materials leaving the vaporization chamber enter the input end of a dilution chamber of the furnace tube. The dilution chamber is designed such that the bulk materials are rapidly condensed as they exit the furnace tube in a manner that prevents them from agglomerating with one and another. In this manner, the present invention successfully forms nano sized particles at high concentrations and at high levels of purity.

The furnace tube condenses the bulk materials without agglomerating them because the furnace tube has an additional gas flow introduced into the dilution chamber through a dilution gas port. The increased gas flow introduced through the dilution gas port serves to rapidly evacuate the dilution chamber, thereby forcing the vaporized materials to be rapidly cooled at the exit of the dilution chamber at the same time that the velocity of the gas flow is dramatically increased. The result of this rapid cooling and increased gas flow is that the vaporized materials condense into nano sized particles within the gas flow, and do not agglomerate with one and another. To accomplish this objective, rate of the gas into the vaporization chamber and the gas flow rate into the dilution chamber are adjusted to insure that the residence time that the vaporized bulk material in the dilution chamber is minimized. By way of example, and not meant to be limiting, it is preferred that residence time that the vaporized bulk material in the dilution chamber is no more than 30 seconds, and it is more preferred that the vaporized bulk material are in the dilution chamber no more than 5 seconds. In this manner, the present invention forms nano sized particles in a gas flow at higher concentrations than methods previously known in the art.

In a preferred embodiment of the present invention, the rapid transport of the vaporized materials through the dilution port is assisted by providing a cup receiver having an input end within the dilution chamber and an output end used as the output end of the dilution chamber. Generally, a "cup receiver" is any tube having a relatively large entrance at one end, and a relatively smaller exit at the opposite end.

The cup receiver is positioned within the dilution chamber such that vaporized materials entering the dilution chamber traverse a short distance of open space, and then enter the relatively large opening of the cup receiver. The additional gas flow introduced through the gas port also enters the cup receiver at the relatively large end. In this manner, the gas flow and the vaporized materials are combined within the cup receiver in a manner that minimizes the dilution of the vaporized materials. The dilution materials are thus moved through the cup receiver as quickly as possible, exiting at the output end, thus maximizing the temperature drop and cooling the vaporized materials as quickly as possible.

Modeling of the gas flow in the preferred embodiment has shown that the dilution materials are moved through the cup receiver essentially along a linear pathway, thus maximizing the temperature drop thereby cooling the vaporized materials as quickly as possible.

As will be recognized by those having ordinary skill in the art and the benefit of this disclosure, the present invention also enables the creation of less than pure nano sized particles, various particle sizes, and various particle size distributions. For example, and not meant to be limiting, when forming particles of $C_{60}$, adjusting the mass flow rate, gas flow rate, and furnace temperature, will have an impact on the purity, particle sizes, and particle size distributions that can be formed in the apparatus of the present invention. As shown in the Table 1 below, both particle size and purity are affected by the furnace tube temperature. Accordingly, the present invention should be understood to encompass all systems which adjust mass flow rates, gas flow rates, and furnace temperatures to produce specific particle sizes, size distributions, and purities. Those having ordinary skill in the art will recognize that in applications such as toxicology studies and chemical manufacturing this adjustability will allow a practitioner the flexibility to produce a wide variety of outputs.

TABLE 1

| Furnace Temp (deg C.) | Particle Size (nm) | Particle Conc. (µg/L) | Chemistry | Notes |
|---|---|---|---|---|
| 500 | 50-60 | 2 | Pure $C_{60}$ | Some larger particles also observed |
| 550 | 50-60 | 2 | Pure $C_{60}$ | Negligible larger particle observed (<0.3% N) |
| 600 | 40-50 | 1.5-2 | ~90-95% $C_{50}$ | Smaller particles but some graphitization observed |
| 650 | 40-50 | 1.5-2 | ~80-99% $C_{50}$ | Smaller particles but some graphitization observed |
| 700 | 30-40 | 1.0-1.5 | ~50-70% $C_{60}$ | Smaller particles, lesser mass conc. with lot of graphitization |
| 800+ | 20-35 | 0.5-1.5 | <50% $C_{60}$ | Smaller particles, less mass conc., hugh number conc, impure $C_{60}$ |

Effects of furnace temp on $C_{60}$ distribution with the sample flow rate through the furnace constant at 400 ml/min The present invention also contemplates the use of an extraction port positioned between the solid aerosol disperser and the vaporization chamber. The extraction port is used to extract a portion of the gas flow prior to introduction into the vaporization chamber. The extraction port includes a separator, where a portion of the bulk material having relatively larger particle sizes is separated and extracted prior to introduction into the vaporization chamber. This assists in reducing the particle size further prior to introducing the particles to the inlet of the furnace tube. The separator may be a cyclone, an impact device, or combinations thereof.

While the method of the present invention is particularly well suited to forming nano sized particles of $C_{60}$, other materials which may be processed by the present invention include, but are not limited to cerium oxide, carbon nano tubes, titanium dioxide, $C_{70}$, $C_{76}$, and $C_{84}$.

When forming nano particles of $C_{60}$ with the present invention, it is preferred that the bulk material have a particle size of between about 1 µm and about 1.5 µm mass median aerodynamic diameter (MMAD) when introduced into the vaporization chamber. It is also preferred that the vaporization chamber be held at a temperature between about 500° C. and 600° C. to vaporize the bulk particles of $C_{60}$.

It is preferred that the gas used to carry the bulk materials from the solid aerosol disperser to the furnace tube (referred to herein as the "first gas") and the gas introduced into the dilution chamber through a dilution gas port (referred to herein as the "second gas") are both inert gases. As used herein, "inert" simply means that the gases are not reactive with the bulk material or the nano particles formed of the bulk material. Accordingly, preferred inert gases include, but are not limited to He, $N_2$, Ar, Kr, Ne, and combinations thereof.

Those having ordinary skill in the art having the benefit of this disclosure will readily recognize that the present invention enables inhalation toxicology testing of Buckminster fullerenes (such as $C_{60}$) which previously could not be conducted as a result of the limitations of the prior art. While the present invention should not be considered as being limited to this use, it should be recognized that the present invention provides this ability because the present invention allows the generation of aerosols of $C_{60}$ at high concentration in an oxygen rich environment essentially identical to air.

As described above, when the second gas is introduced into the dilution chamber, the flow of the second gas is sufficient to eject the bulk material from the exit, thereby condensing the bulk material into nano sized particles. The nano sized particles are then cooled to a temperature sufficient to prevent oxidation, whereupon a flow of oxygen may be introduced without oxidizing the nano sized particles. By selecting the inert gases as $N_2$, and adding an amount of oxygen sufficient such that the total amount of oxygen in the resulting gas flow greater than about 19.5%, the present invention allows the creation of an aerosol of nano particles of $C_{60}$ in a gas flow essentially identical to air. Of course, other trace gases also found in air may also be included in the oxygen flow, thereby making the resultant gas a perfect match with air, but such is generally not required for effective toxicology studies. Exposing living organisms to this aerosol thereby enables inhalation toxicology testing of Buckminster fullerenes.

BRIEF DESCRIPTION OF THE DRAWINGS

The following detailed description of the embodiments of the invention will be more readily understood when taken in conjunction with the following drawings, wherein:

FIG. 1a is a graph showing an exploded view of the XRD spectrum to confirm purity of $C_{60}$ sample.

FIG. 2 shows the fully assembled rotary dust generator showing drum driver, body and cap.

FIG. 3a is a perspective view of PAC.

FIG. 3b is a schematic diagram of PAC.

DETAILED DESCRIPTION OF THE PREFERRED EMBODIMENTS

Figure 12:
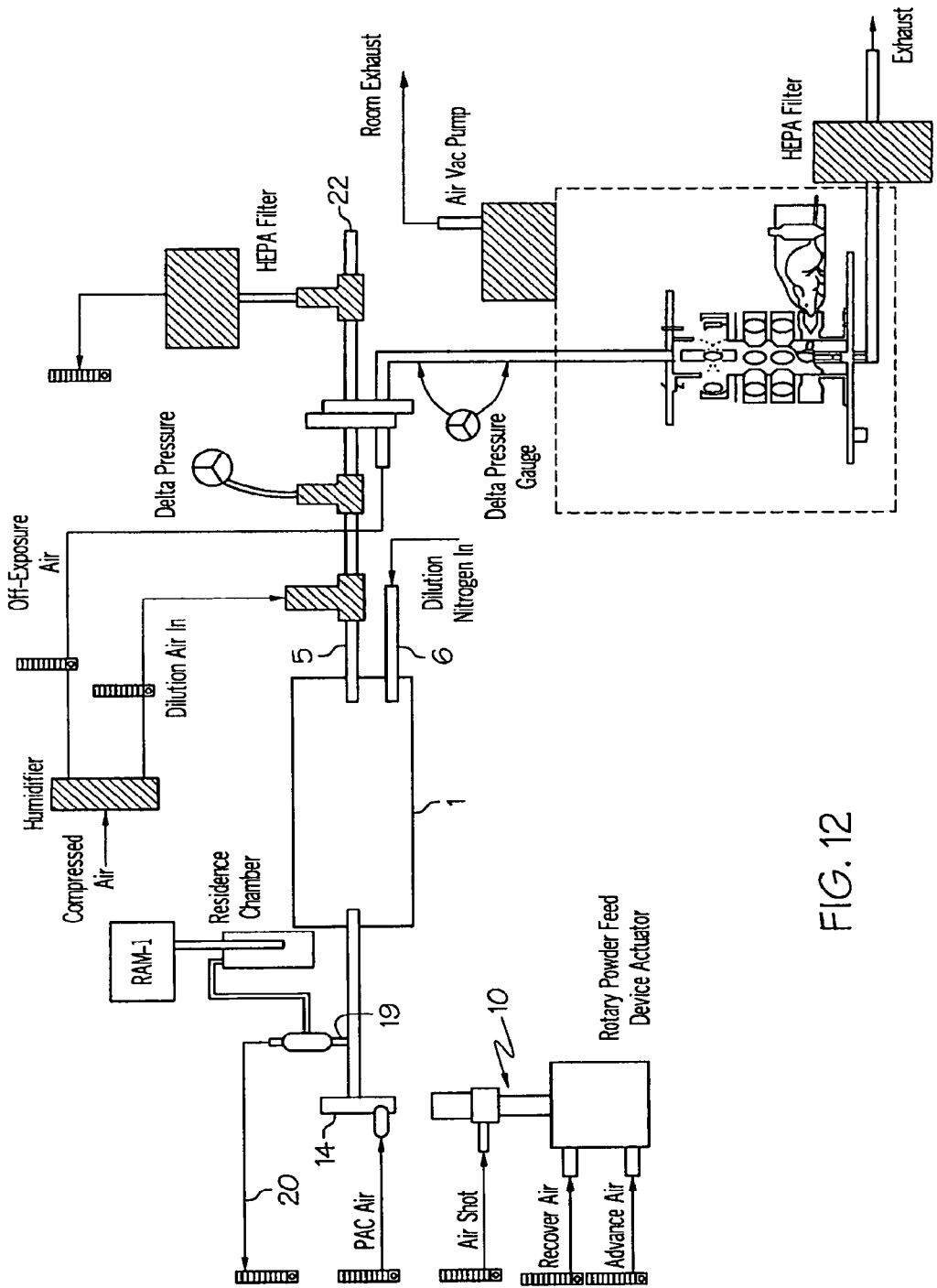
FIG. 12 is a schematic showing the assembly of a preferred embodiment of the present invention.

The final schematic of the system used to generate the aerosols of $C_{60}$ nano particles is depicted in FIG. 12.

To demonstrate one embodiment of the present invention, a series of experiments were conducted using $C_{60}$ particles supplied by SES Research, Houston, Tex. The bulk material consisted of dark colored, fine particles and had been stored at room temperature. The bulk material was milled in a Wig-L-Bug (Crystal Laboratories, Garfield, N.J.) for about 2 minutes before feeding to the generator.

The solid air disperser used to initially generate $C_{60}$ aerosols for these studies is available from the assignee herein, Battelle Memorial Institute, Columbus Ohio. Briefly, as shown in FIGS. 2, 3a and 3b, it consisted of a rotary dust feed device 10 coupled to a single jet Particle Attrition Chamber (PAC) 14.

Figures 2, 3A, 3B:
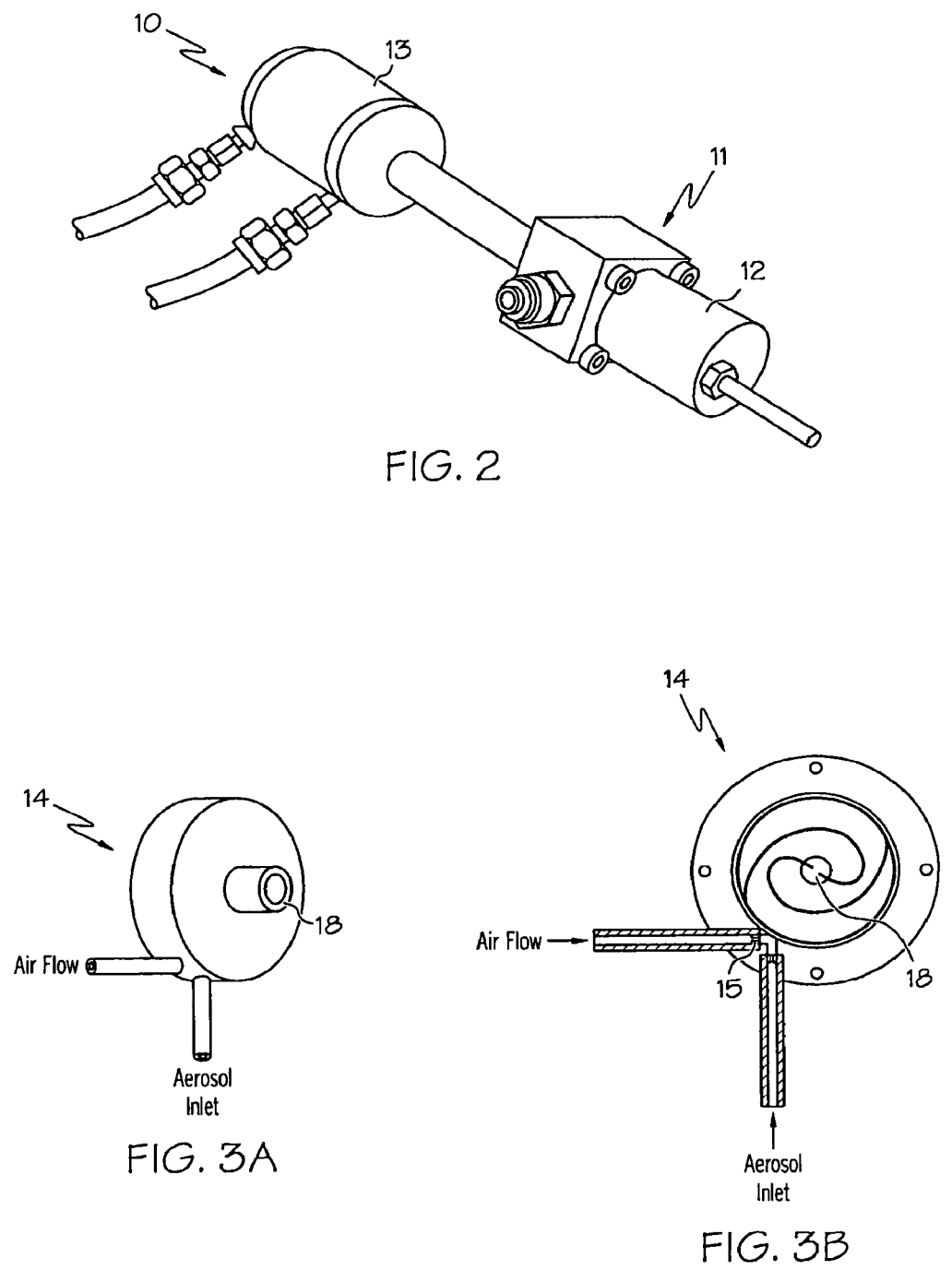

As shown in FIG. 2, the rotary dust feed device 10 consists of a drum (not visible), a body 11, a cap 12 and a drum rotation driver 13. The drum, which rotated during the generation, serves as the reservoir for the bulk material. The drum rotation is accomplished by a compressed air driven Valco valve driver (VICI Valco Instruments Co., Houston, Tex.) which in turn is controlled by the generator control unit. As the drum rotates, metering ports in a disk on the bottom of the drum are filled with a small amount of the powdered $C_{60}$ bulk material. A stainless steel screen at the bottom of each metering port prevents the material from falling through the port, while allowing the carrier gas (nitrogen) to pass through from below. Each metering port is sequentially aligned with the carrier gas inlet in the body each time the driver was actuated by the generator control circuit.

A carrier gas solenoid valve is then pulsed open by the generator control unit, creating a carrier gas puff which blows the bulk material from the port and disperses it into a flow of nitrogen. The output of the generator is regulated by adjusting the rotation cadence and duration of the nitrogen puff using the generator control unit.

A Particle Attrition Chamber (PAC) 14 shown in FIGS. 3 and 3b serves to reduce the particle size of the suspended powder of the bulk material. The PAC 14 is similar to a cyclone separator with the addition of an air jet 15 operated at 30 psi at 90° to the aerosol inlet flow 17. The air jet 15 breaks up the particle clumps until the particles are small enough to exit the center aerosol outlet port 18. A portion of the flow exiting the PAC 14 was siphoned such that ~0.400 lpm was passed through to the furnace tube 1 (shown on FIGS. 13 and 17). Referring to FIG. 12, siphoning using a generator siphon 20, occurred at a t-joint 19, which may have had the additional effect of separating larger particles and passing smaller particles to the furnace tube 1. The t-joint 19 has the effect of acting as a separator by acting as an impact regime where the larger particles impact the t-joint 19 and are thus siphoned off, whereas smaller particles remain in the gas flow, and are directed toward the furnace tube 1. By way of example and not of limitation, other devices, such as a cyclone, could also be used as a separator.

Figure 13:
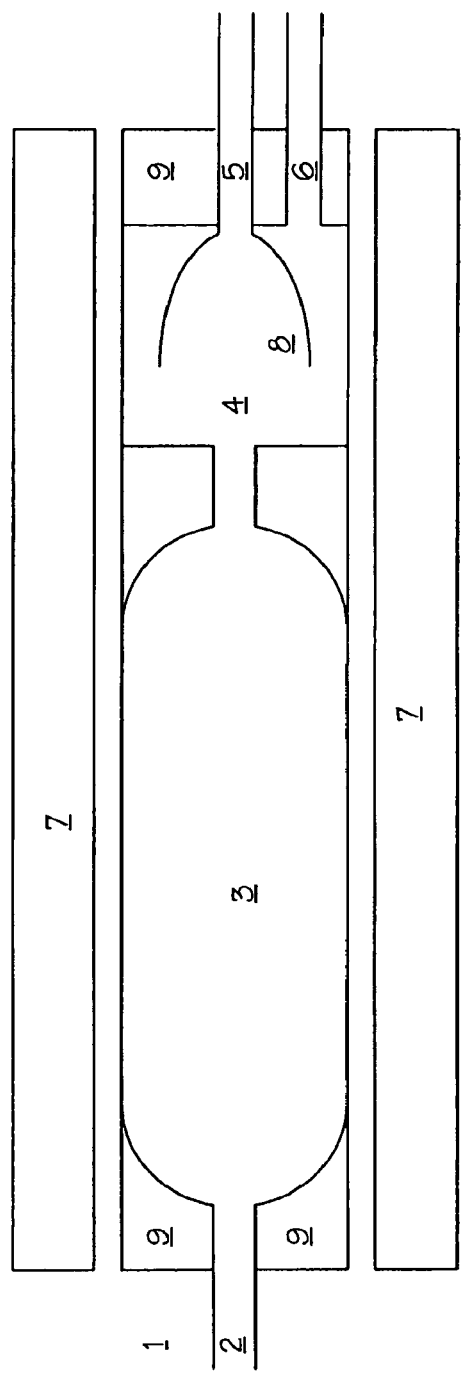
FIG. 13 is a schematic showing the design of the furnace tube.
Figure 17:
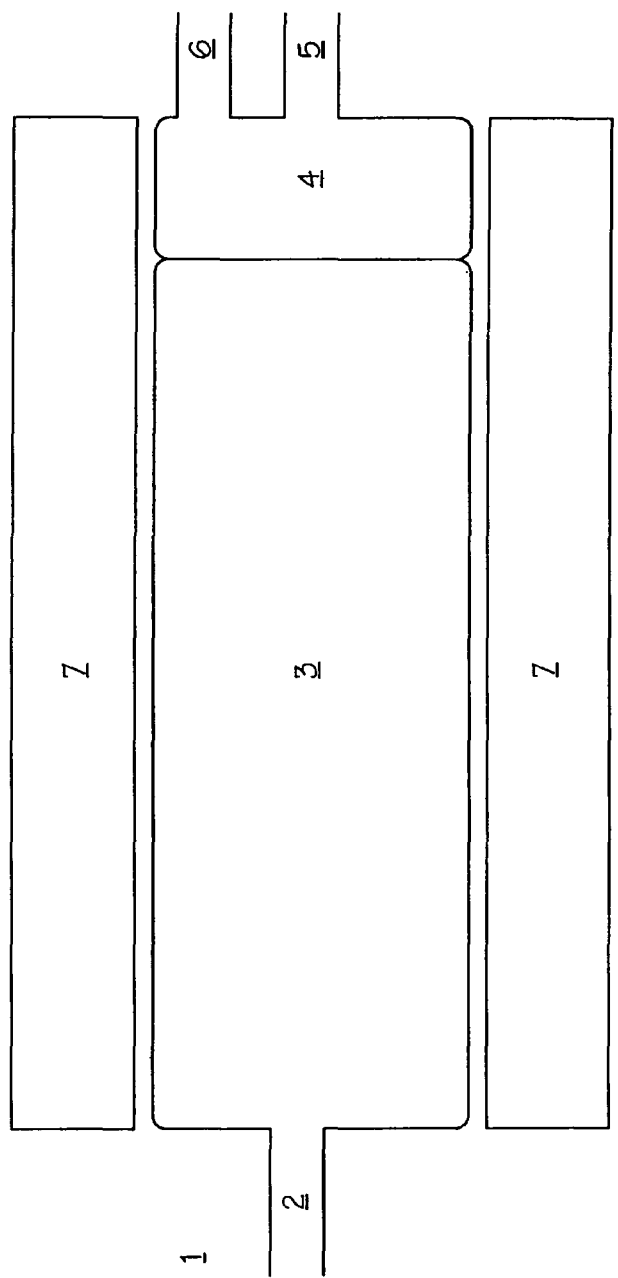
FIG. 17 is a schematic showing the design of a preferred embodiment of the furnace tube.

The aerosols exiting the t-joint 19 were passed to the furnace tube 1 shown in FIGS. 13 and 17. As shown in FIG. 17, the furnace tube 1 consists of an inlet 2 and a vaporization chamber 3 in communication with a dilution chamber 4. The dilution chamber 4 has an exit 5 and a gas port 6. Surrounding the furnace tube 1 is a heating element 7. In these experiments, the vaporization chamber 3 was a 12 inch long glass tube with a 2 inch diameter. The dilution chamber 4 was a 2 inch long glass tube with a 2 inch diameter. The inlet 2 to the to vaporization chamber 3 and the exit 5 were all ⅜ inch glass tubing. The opening between the vaporization chamber 3 and the dilution chamber 4 was also ⅜ inch. The gas port 6 in the dilution chamber 4 was ¼ inch tubing.

Surrounding the furnace tube 1 is a heating element 7. The heating element 7 for these experiments was a commercial furnace Model F21135 supplied by Barnstead International Dubuque, Iowa. The furnace was maintained at a temperature (550° C.) and the flow rate through inlet 2 was ~0.400 lpm, which was sufficient to ensure flash vaporization of the $C_{60}$ aerosol. Rapid cooling caused by the introduction of compressed nitrogen at ~0.500 lpm at gas port 6 resulted in the creation of nano-sized aerosols.

The general arrangement of a preferred embodiment is shown in FIG. 13. As shown in the figure, the furnace tube 1 consists of an inlet 2, a vaporization chamber 3 in communication with a dilution chamber 4. The dilution chamber 4 has a cup receiver 8, with an output or exit 5 and a gas port 6. Surrounding the furnace tube 1 is a heating element 7. At either end of the furnace tube 1, buffer zones 9 isolate the interior of the furnace tube 1 from the surrounding atmosphere.

Figure 18:
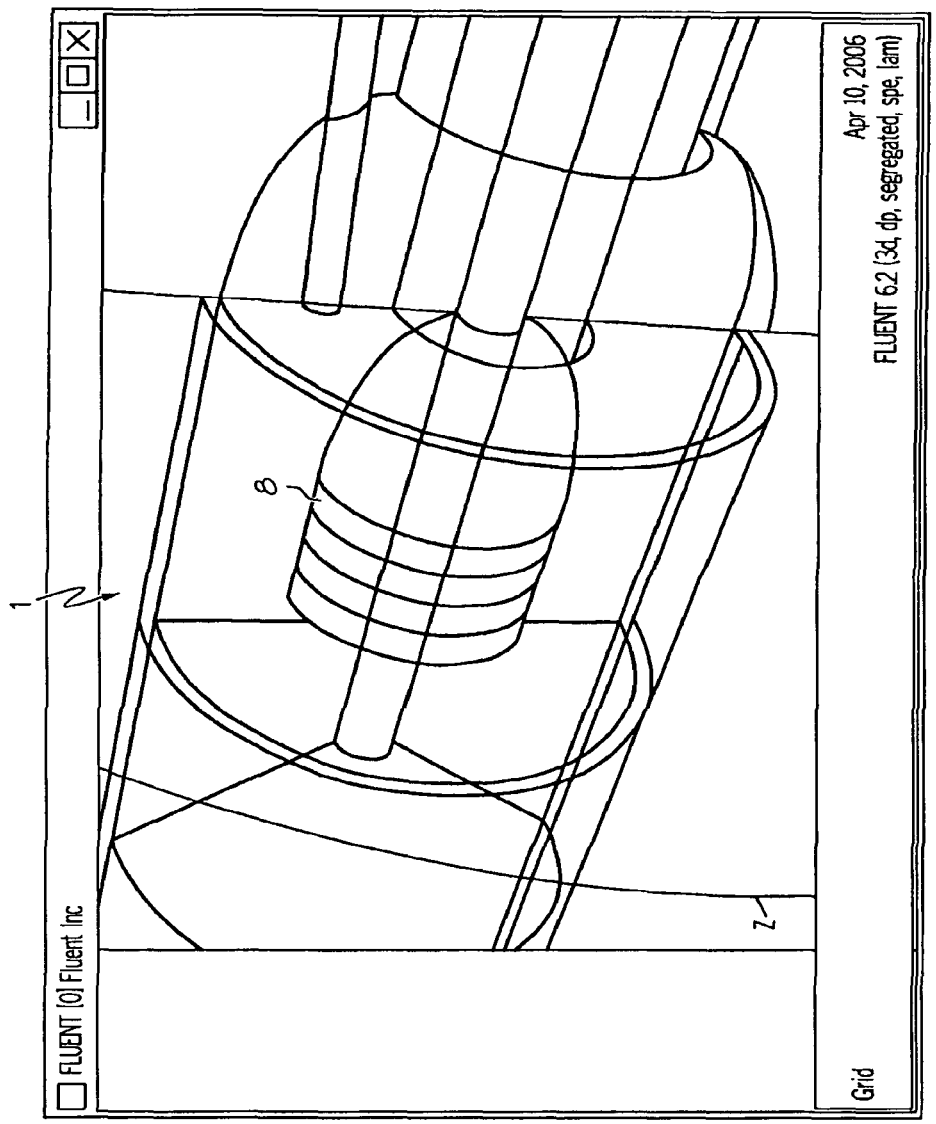
FIG. 18 is a three dimensional model of a preferred embodiment of the furnace tube created by The FLUENT® Computational Fluid Dynamics Package, Release 6_2.16 (3-dimensional, double precision, segregated solver, laminar flow model with conjugate heat transfer), Fluent Inc., Lebanon, N.H. U.S.A.
Figure 19:
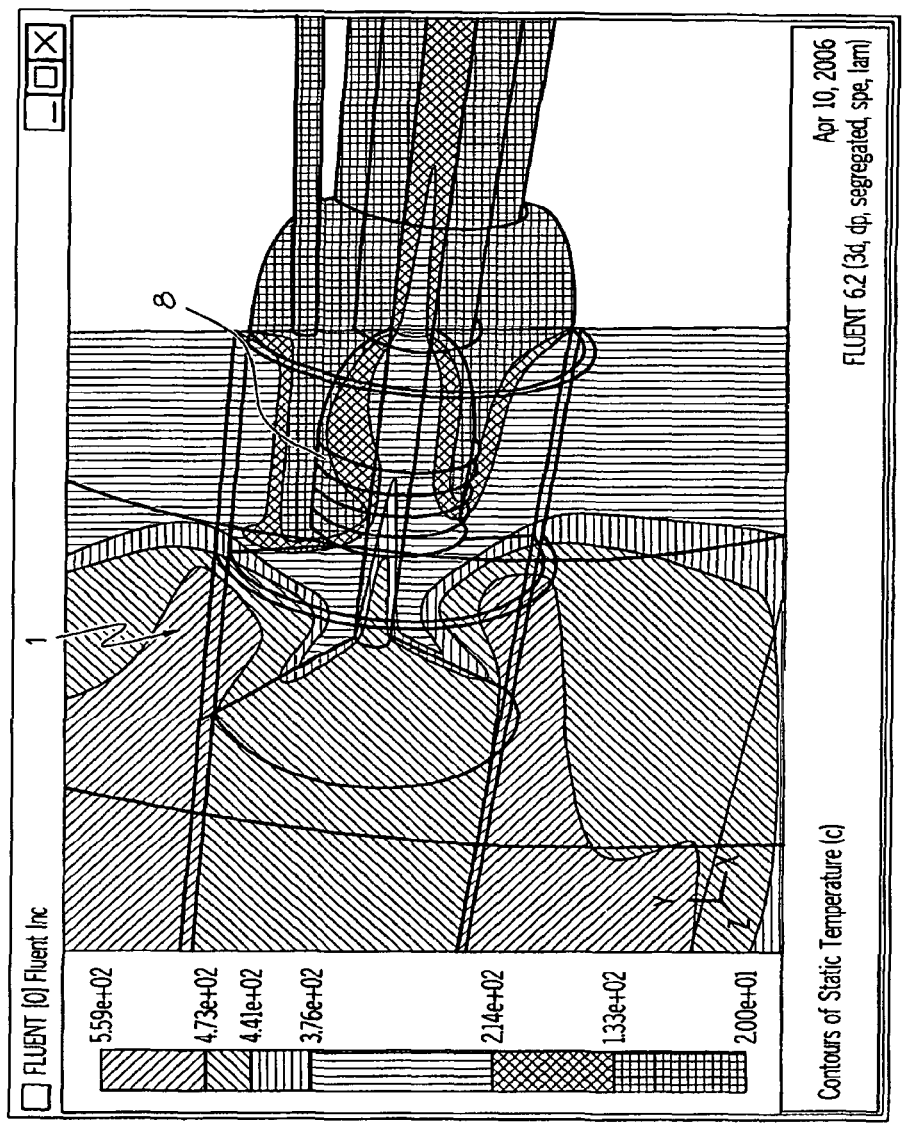
FIG. 19 is a three dimensional view of the temperature profile inside a preferred embodiment of the furnace tube created by The FLUENT® Computational Fluid Dynamics Package, Release 6.2.16 (3-dimensional, double precision, segregated solver, laminar flow model with conjugate heat transfer), Fluent Inc., Lebanon, N.H. U.S.A.
Figure 20:
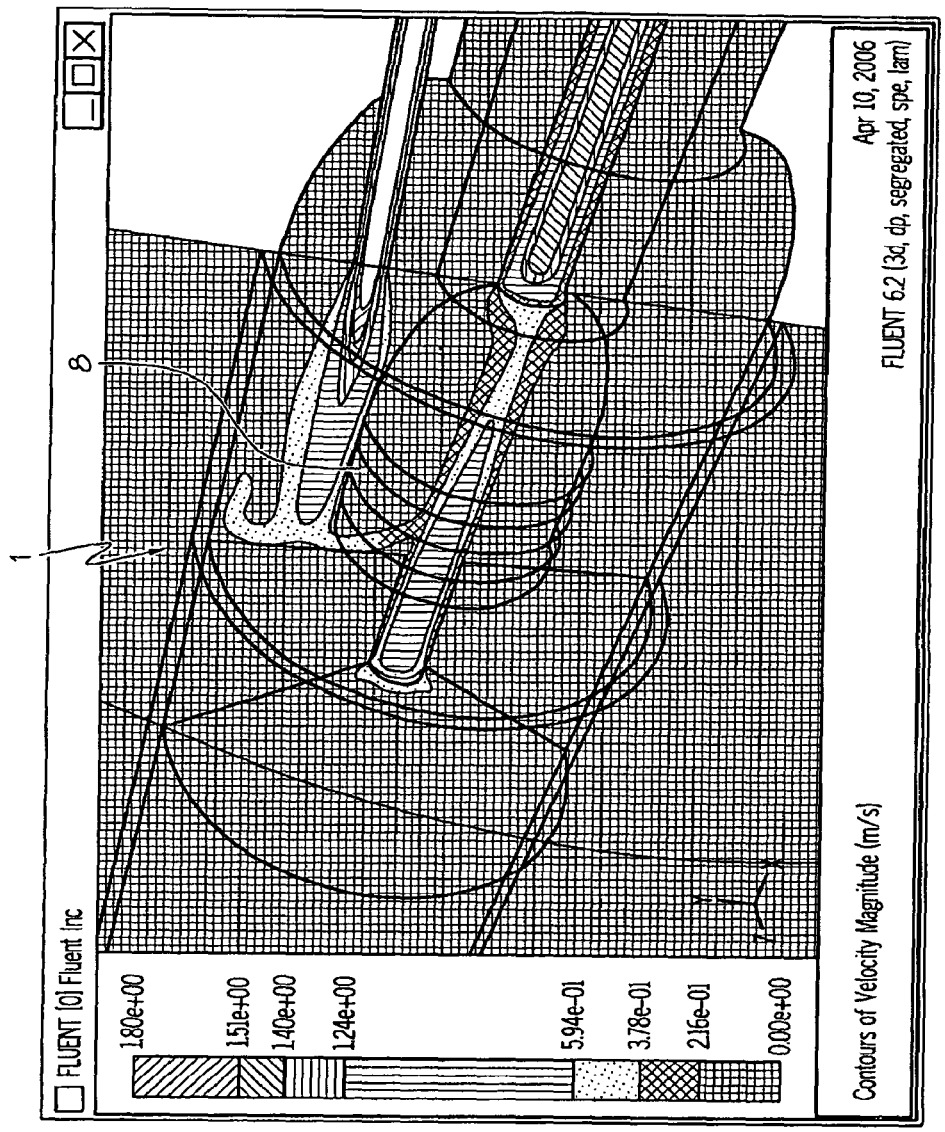
FIG. 20 is a three dimensional view of the gas velocity profile inside a preferred embodiment of the furnace tube created by The FLUENT® Computational Fluid Dynamics Package, Release 6.2.16 (3-dimensional, double precision, segregated solver, laminar flow model with conjugate heat transfer), Fluent Inc., Lebanon, N.H. U.S.A.
Figure 21:
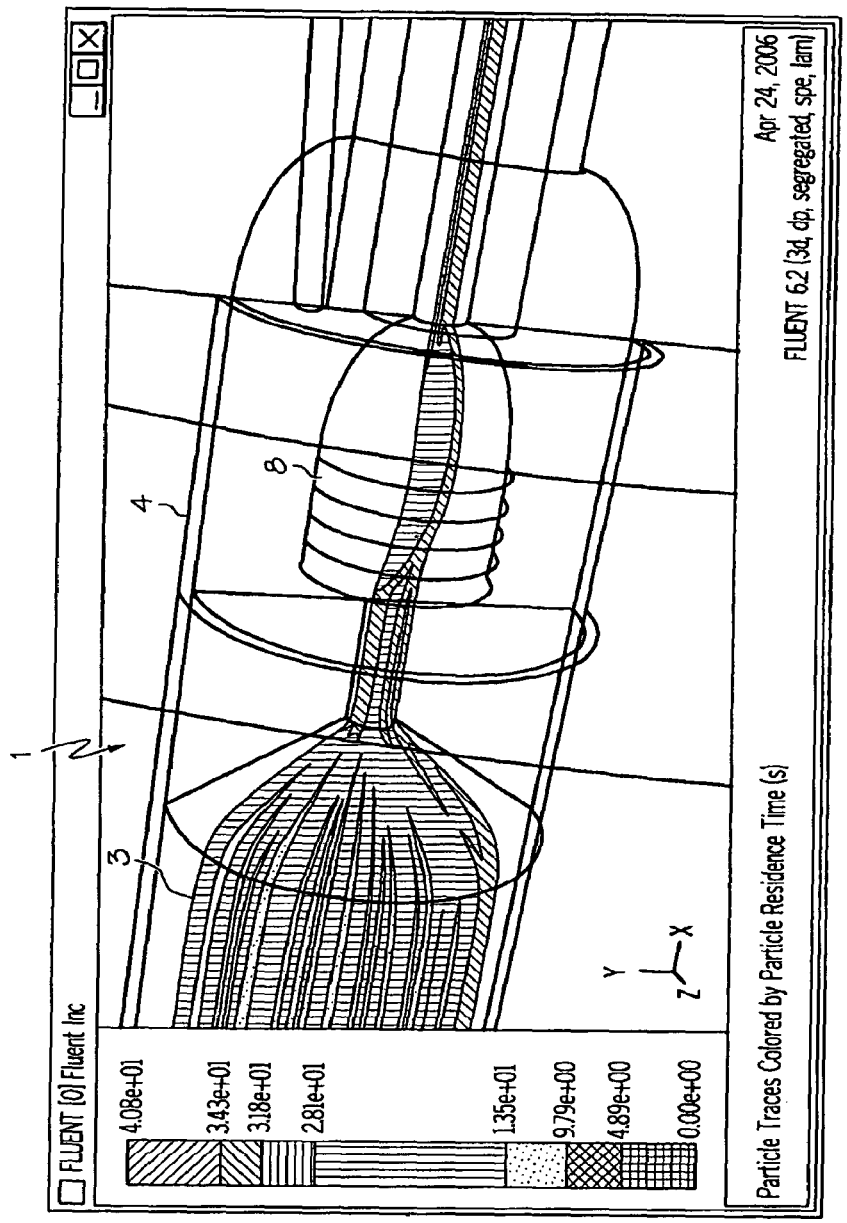
FIG. 21 is a three dimensional view of the particle trajectories inside a preferred embodiment of the furnace tube created by The FLUENT® Computational Fluid Dynamics Package, Release 6.2.16 (3-dimensional, double precision, segregated solver, laminar flow model with conjugate heat transfer), Fluent Inc., Lebanon, N.H. U.S.A.

FIGS. 18, 19, 20 and 21 are models of the gas flow in the preferred embodiment of the furnace tube 1. The models were created by The FLUENT® Computational Fluid Dynamics Package, Release 6.2.16 (3-dimensional, double precision, segregated solver, laminar flow model with conjugate heat transfer), Fluent Inc., Lebanon, N.H. U.S.A. FIG. 18 is a three dimensional model of a preferred embodiment of the furnace tube 1, FIG. 19 is a three dimensional view of the temperature profile inside the furnace tube 1, FIG. 20 is a three dimensional view of the gas velocity profile inside the furnace tube 1, and FIG. 21 is a three dimensional view of the particle trajectories inside the furnace tube 1. As shown in the figures, the dilution materials are moved through the cup receiver 8 essentially along a linear pathway, thus maximizing the temperature drop thereby cooling the vaporized materials as quickly as possible.

Figure 14:
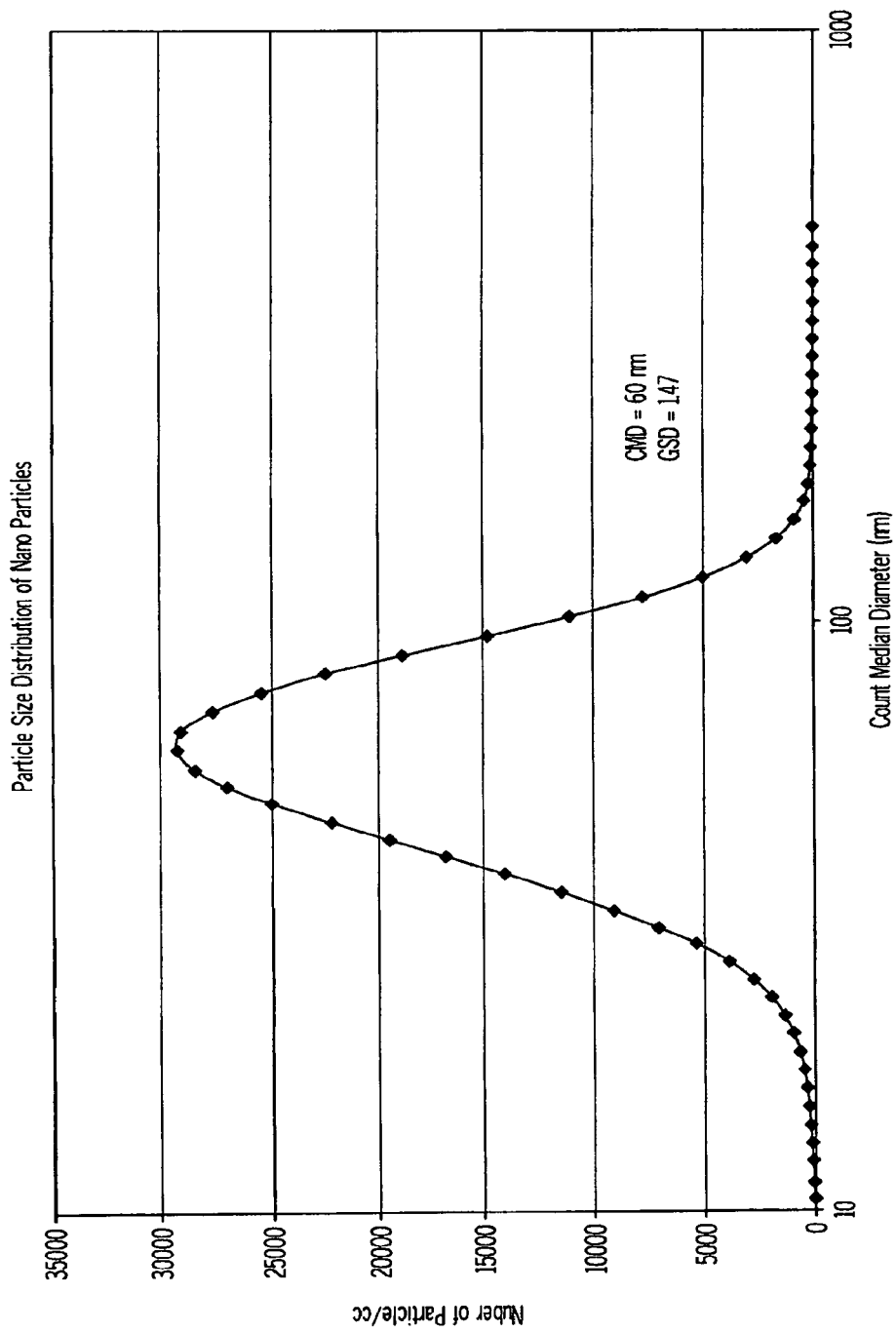
FIG. 14 is a graph showing the particle size distribution of test aerosols obtained using SMPS.
Figure 15:
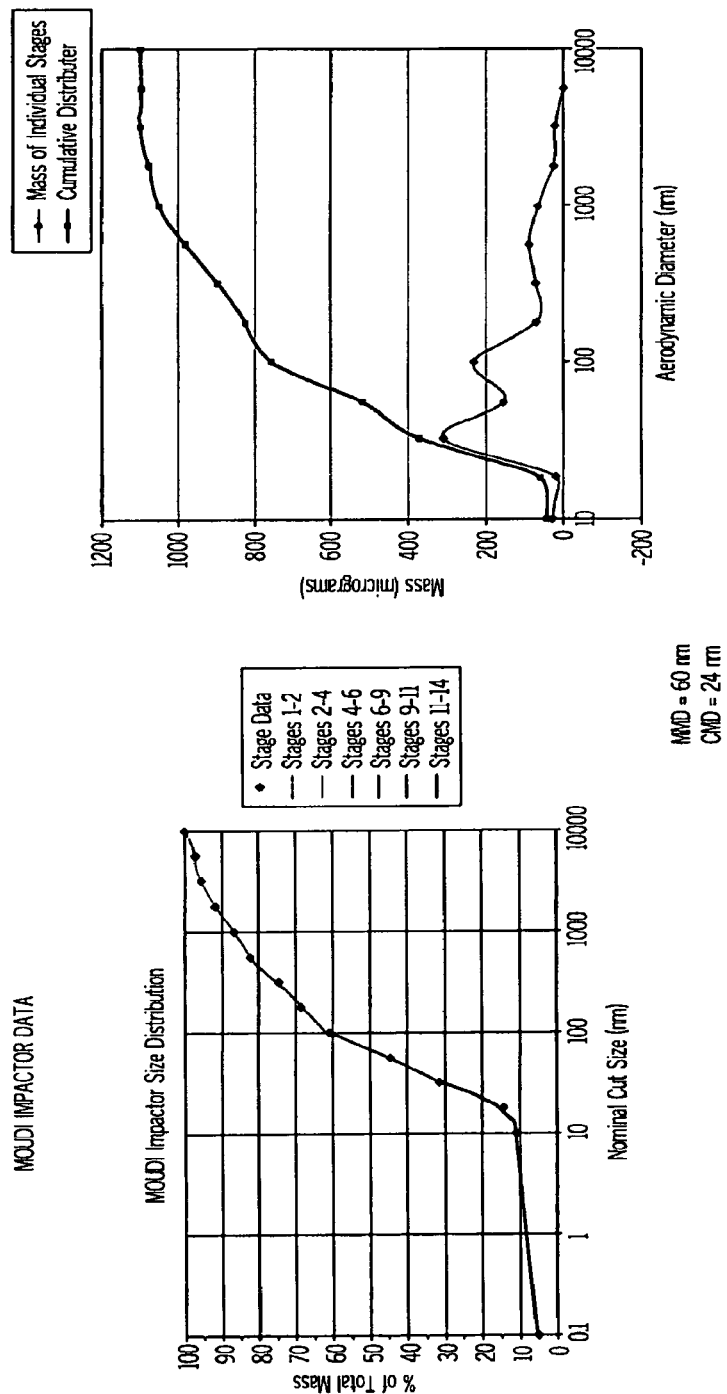
FIG. 15 is a graph showing the particle size distribution of test aerosols obtained using MOUDI impactor.
Figure 16:
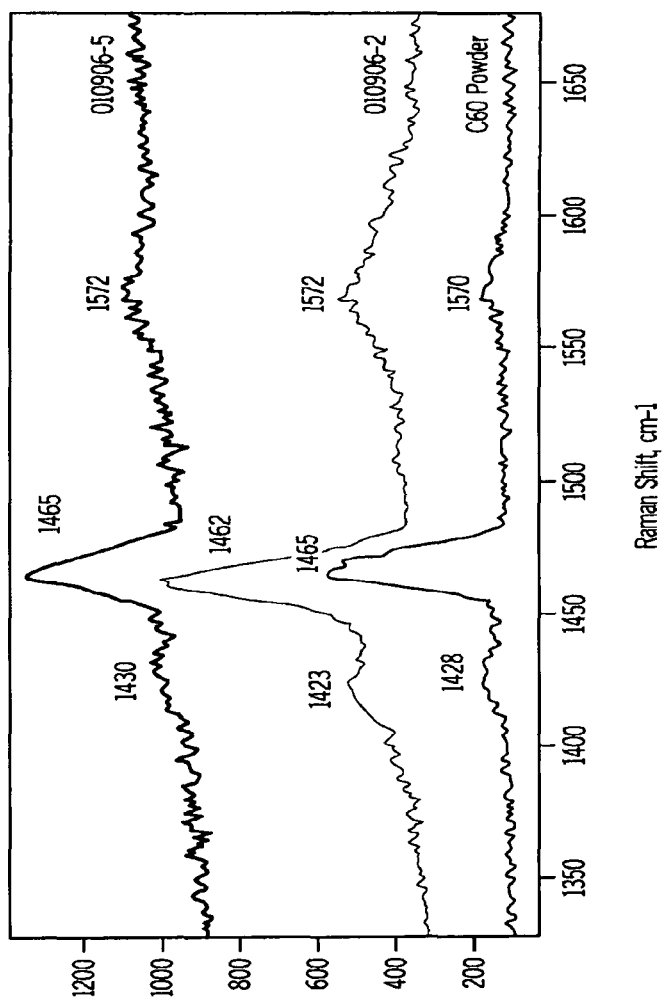
FIG. 16 is a graph showing the chemical characterization using Raman spectroscopy.

The size distribution of the aerosols produced by the methods and apparatuses of the present invention was determined using a cascade impactor (In-Tox Products, Model No. 02-130/SMK, Albuquerque, N.M.), Scanning Mobility Particle Sizer (TSI Model 3034, Shoreview, Minn.) (SMPS) (see FIGS. 5 and 14), TEM imaging (JEOL 2010F, Jeol, Peabody, Mass.) (see FIGS. 6 and 7) and MOUDI impactor (MSP Corp, 125B NanoMOUDI, Shoreview, Minn.) (see FIGS. 8 and 15). The chemical characterization of $C_{60}$ was performed using Laser Raman Infrared spectroscopy (Spex Model 1877, Spex, Edison, N.J.) (see FIGS. 9 and 16) and high performance liquid chromatography (HPLC, Agilent 1100) (see FIG. 11).

Samples of aerosols produced by the present invention were collected at sampling port 22 (see FIG. 12). The collected samples were analyzed for particle size distribution using four different instruments. In the initial stages of the experiments, an 8 stage mercer cascade impactor was used to establish the proof of principle. The cut-point of the last stage of the impactor was ~230 nm. The flow rate through the impactor was approximately 1.645 lpm. The cascade impactor stages were pre-coated with silicone grease. The individual stage filters were analyzed using High Performance Liquid Chromatography.

At the later stages, the aerosols were sampled through a Scanning Mobility Particle Sizer (TSI Model 303s Shoreview, Minn.) (see FIGS. 5 and 14). The SMPS size separates the particles on the basis of electrical mobility of the particles. The Model 3034 has the size range from 10 to 487 nm electrical mobility diameter. The aerosol stream passes through a single-stage cyclone which removes large particles (>0.8 μm) outside the instrument measurement range. The aerosol then passes through a bipolar ion neutralizer that imparts a high level of positive and negative ions. Charged and neutral particles enter the differential mobility analyzer (DMA) column where particles are separated according to their electrical mobility. Electrical mobility is inversely proportional to the particle size so a determination of this property reveals the latter. The particles exiting the DMA are first passed through a saturator picking up butyl alcohol vapor in the sample stream. A second cooling stage causes the vapor to condense on the particles, growing them to readily detectable size. These particles are then directed to a condensation particle counter where a determination of particle concentration is made by passing the particles through a focused laser light.

Figure 1A:
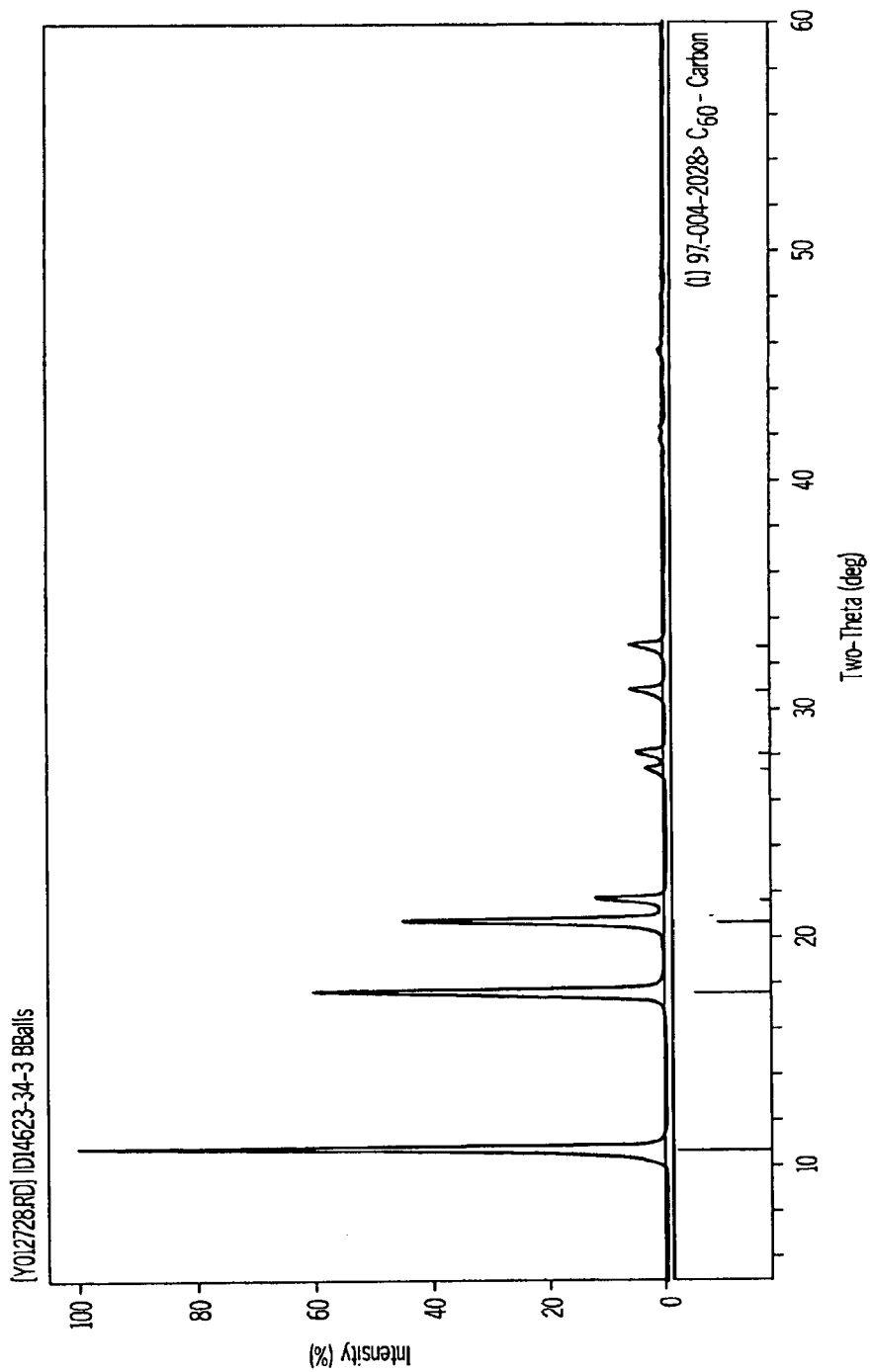
FIG. 1a is a graph showing the phase identification of $C_{60}$ Buckminster fullerene bulk powder using X-Ray Diffraction Analysis.
Figure 1B:
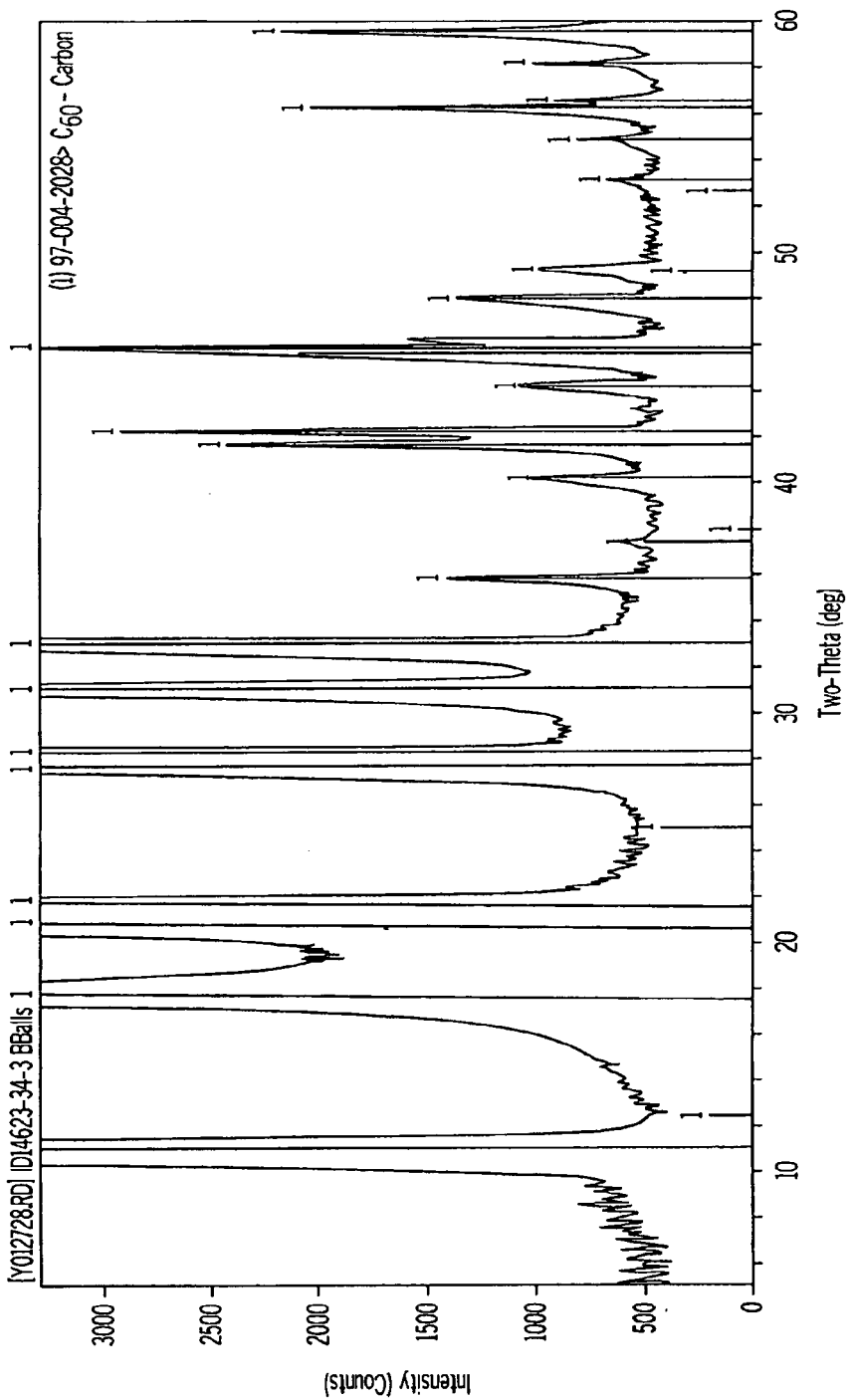
FIG. 1c is a graph showing the Rietveld refinement of $C_{60}$ sample.
FIG. 1d is a graph showing the phase identification of nanoparticulate $C_{60}$ on the filter using XRD.
FIG. 1e is a graph showing the phase identification of microparticulate $C_{60}$ on the filter using XRD.
Figure 1C:
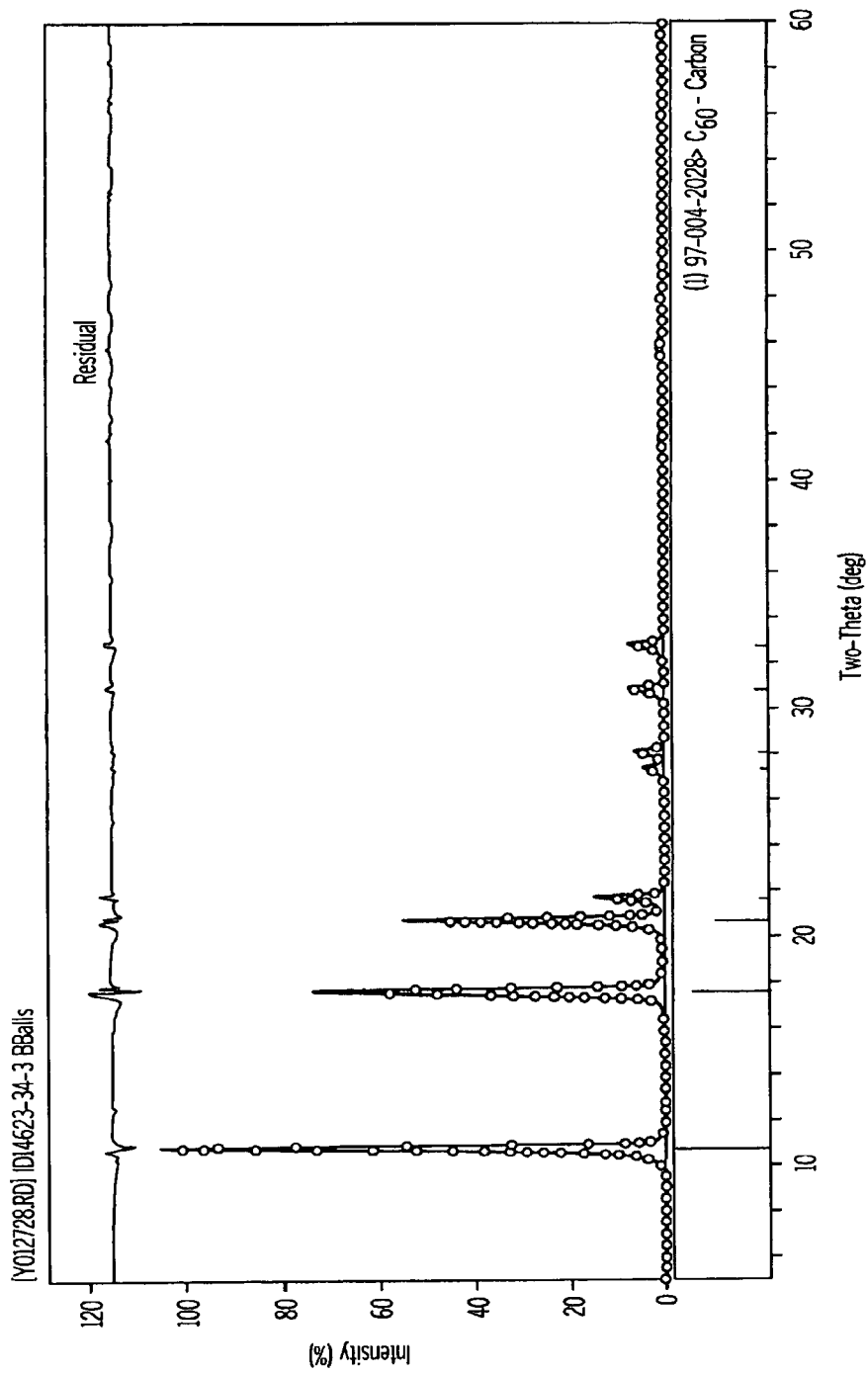
Figure 1D:
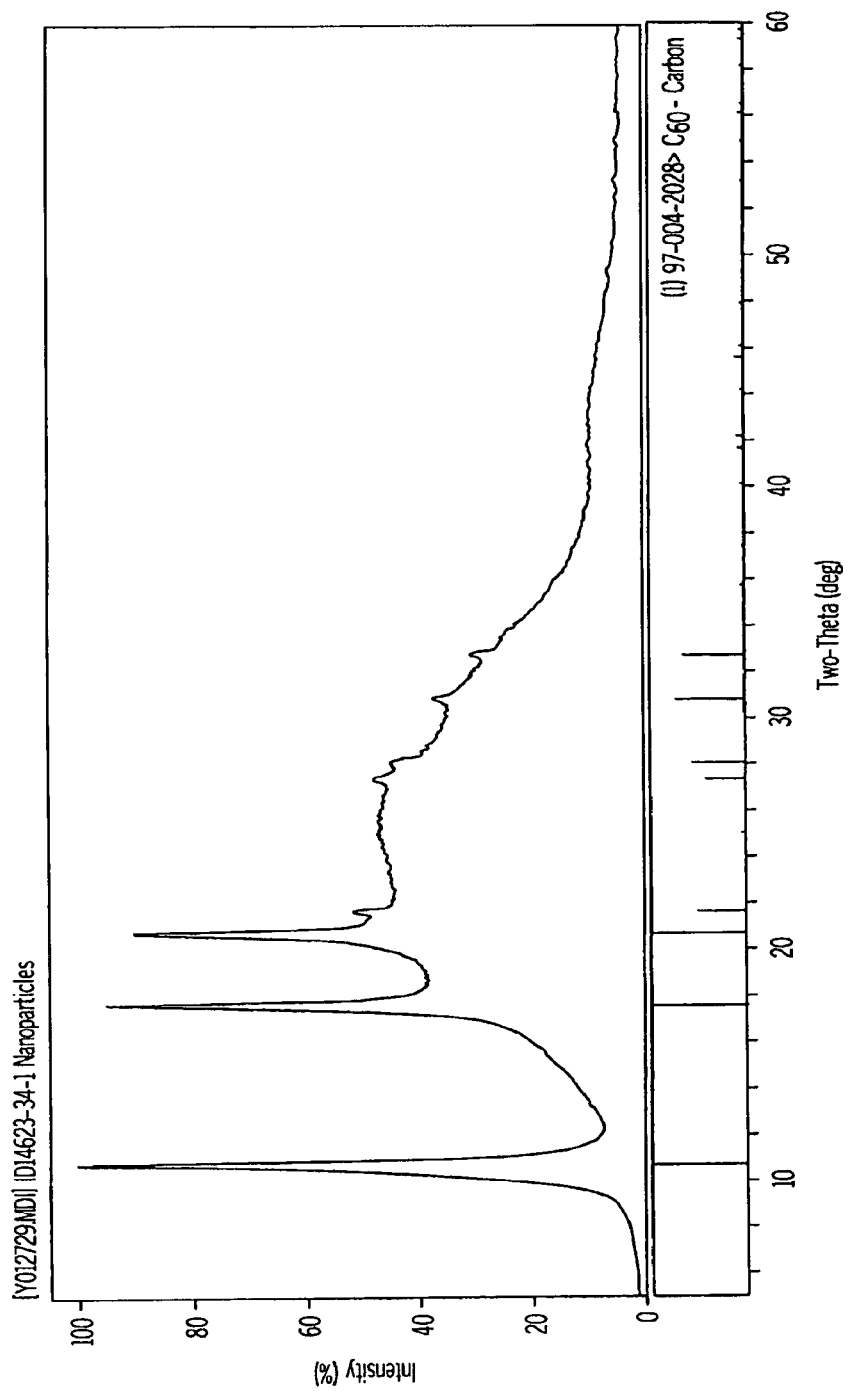
Figure 1E:
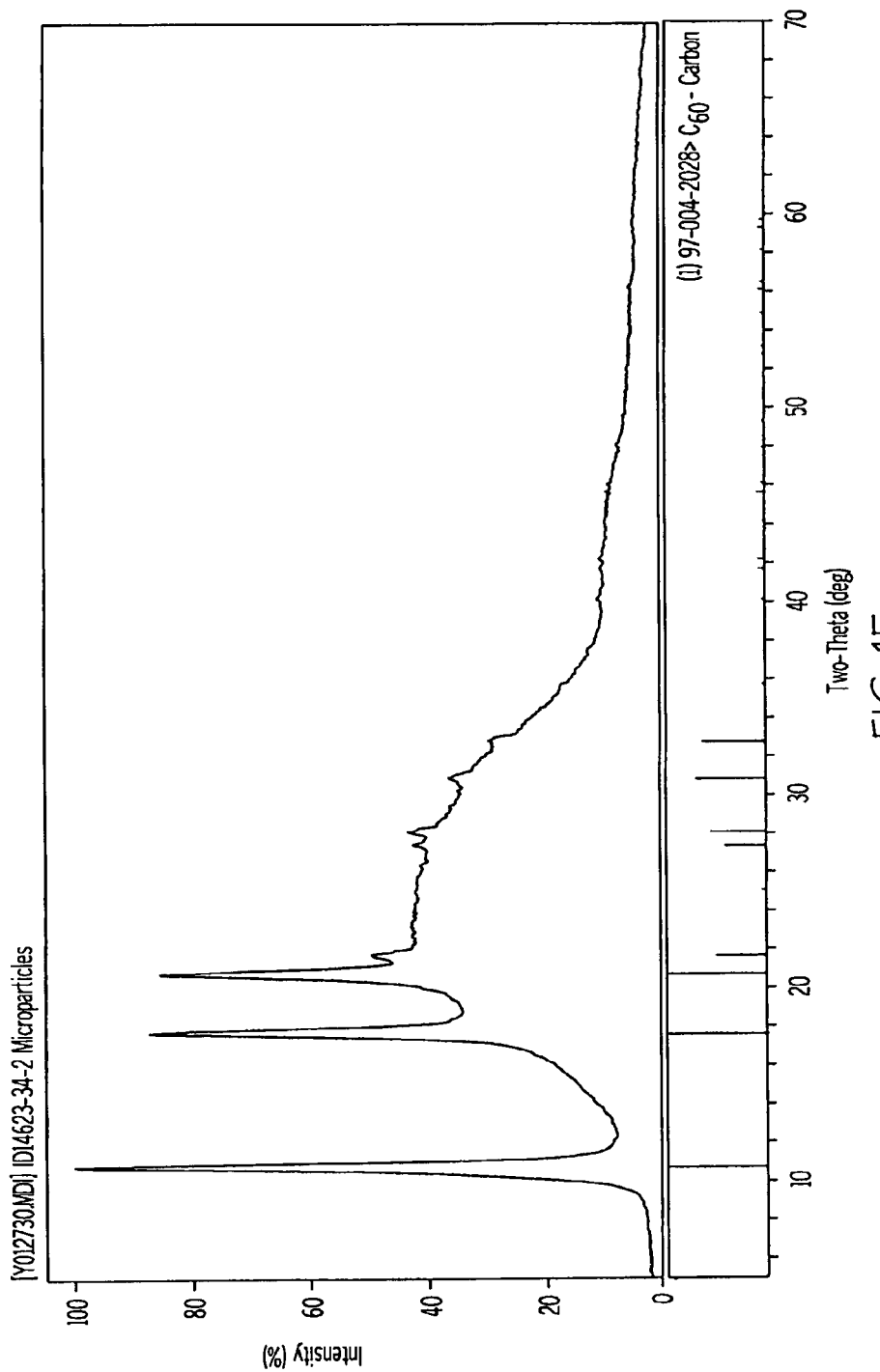
Figure 4:
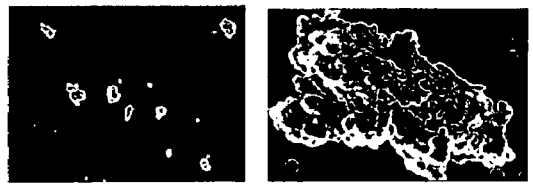
FIG. 4 is two SEM images of $C_{60}$ aerosols without using the furnace.

The samples were also analyzed using a Scanning Electron Microscope (LEO 982 FE-SEM, Zeiss Thornwood, N.Y.) (see FIG. 4) and a Transmission Electron Microscope (JEOL 2010F, Jeol, Peabody, Mass.) (see FIG. 6). The SEM images of the bulk material and during the initial stages of the experiments were taken to establish the size distribution of bulk test material. For SEM, the aerosols were collected on a gold plated 25 mm membrane filters (Pal Gelman, N.Y.). During the later stages of the experiments, TEM images of the samples were taken. For TEM, the samples were collected on a carbon coated lacy copper grid. The samples were collected for enough duration to have uniform coating of test material on the grid. The microscope was operated at 200 KeV with a field emission gun. The compositional analysis software used was INCA x-ray energy spectroscopy system from Oxford Instruments.

The particle size distribution was also determined using a Micro Orifice Uniform Deposit Impactor (MOUDI, MSP Corp, 1258 NanoMOUD,I Shoreview, Minn.) (see FIGS. 8 and 15). This impactor has thirteen rotating stages with nominal cut points varying from 10 μm to 10 nm when operated at an inlet flow rate of 10.0 lpm. The last few stages of the MOUDI impactor are under low pressure which increases the Cunningham slip correction and thus reduces the cut point of the stages.

Laser Raman Infrared spectroscopy, XRD and HPLC were used to establish the chemical purity of the test material at the sampling port 22. Raman spectra were obtained in the backscatter configuration using a Spex (Edison, N.J.) Model 1877 Raman spectrometer equipped with a Princeton Instruments (Trenton, N.J.) LN/CCD detector (see FIGS. 9 and 16). The 488.0 nm line of Coherent (Santa Clara, Calif.) Innova 307 Argon Ion Laser was used for excitation. The laser power was reduced to about 5 mW for most measurements to prevent sample burning, using a combination of filters and beam chopping. Slit width was 400 microns and the exposure time was 500 sec for most measurements. Spectra were corrected for back ground by subtracting the spectrum of filter paper.

Figure 11:
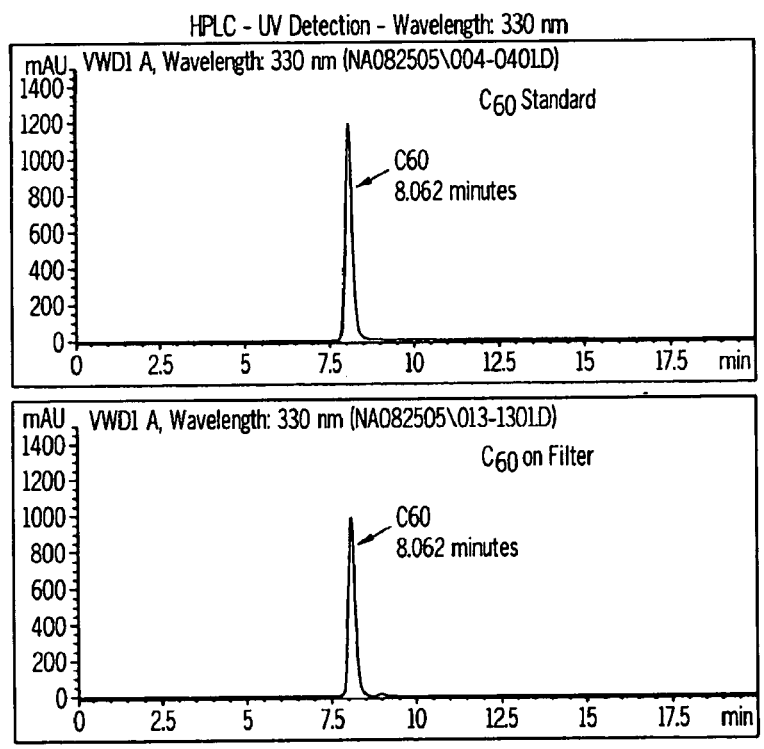
FIG. 11 is a graph showing the typical HPLC spectrum of a $C_{60}$ standard and a sample.

The detection of $C_{60}$ was also carried out using an Agilent 1100 high pressure liquid chromatograph (HPLC) equipped with an Agilent 1100 variable wavelength detector (see FIG. 11). The detector was configured at a wavelength of 330 nm and a peak width of >0.1 min. The iso critical separation method involved a 5 μl injection onto a Cosmosil BuckyPrep analytical column (25 cm×4.6 mm ID; 5 μm) with toluene as the mobile phase. The flow rate of the mobile phase was set at 1 mL/min with a run time of 20 minutes; retention time for the $C_{60}$ was ~8 minutes.

The purity of $C_{60}$ was also verified using XRD analysis (see FIGS. 1a-1d and 10). The XRD spectrum was obtained on 3 samples. The XRD analysis was performed on $C_{60}$ bulk powder, the nano sized $C_{60}$ and the micro sized $C_{60}$. All samples were run in a Siemens D5000 ⊖/⊖ diffractometer using Cu radiation at 40 Kv/30 mA. Scans were run over the range of 5° to 80° with a step size of 0.02°. For the powder sample, the scan time was 10 hours while the filter samples had to be run for 36 hours each. FIGS. 1a-1d show the phase identification of $C_{60}$ Buckminster fullerene bulk powder using X-Ray Diffraction Analysis.

The Mercer cascade impactor analysis was very helpful during the early stages of the experiments while optimizing the furnace temperature and location. During the early stages of testing, the mercer cascade impactor samples were collected without a tube furnace in line to determine the size distribution of the bulk material. Two samples were collected at different pressure of the compressed nitrogen in the PAC. Table 2 shows the MMAD and GSD of the results obtained.

TABLE 2

| Run No. | PAC Pressure (psig) | Aerosol Concn. (μg/L) | Aerosol Size Distribution (MMAD/GSD) |
|---|---|---|---|
| 1 | 20 | 87 | 1.16/2.43 |
| 2 | 40 | 19.3 | 0.94/2.18 |

Figure 5:
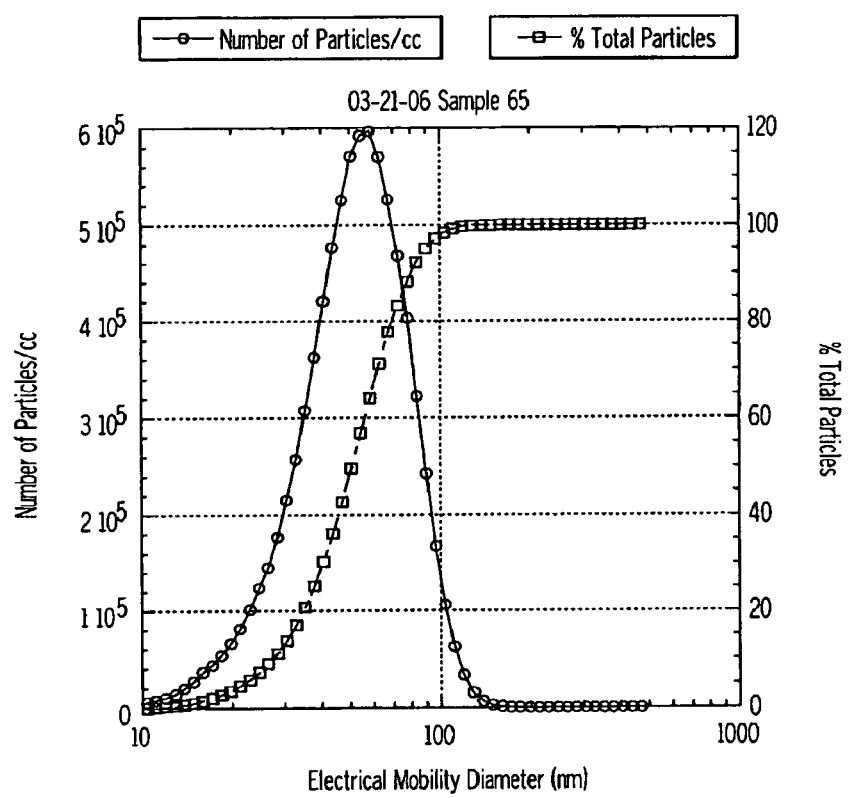
FIG. 5 is a graph showing the concentration (y-axis) versus diameter (x-axis) at the inlet of SMPS.

FIG. 5 shows the SEM images of the filters at 2 different magnifications. Clearly, large aggregates were observed by both the TEM and the cascade impactor analysis.

The furnace tube was then installed in-line into the system and the samples were collected at the sampling port at the outlet of the furnace tube.

Initially, samples were collected on the mercer cascade impactor. Most of the particles were observed on the last 2 stages of the impactor with very less mass (<2% of total mass) on the first five stages (>490 nm). The cut point of the sixth stage was 0.49 μm and the last stage (eighth stage) was 0.23 μm. Nearly 92% of the total mass was collected on the last 2 stages with the cut points of 0.33 μm and 0.23 μm respectively. Some of the operating parameters were changed to further reduce the particle size and other instruments were used for further characterization.

Figure 6:
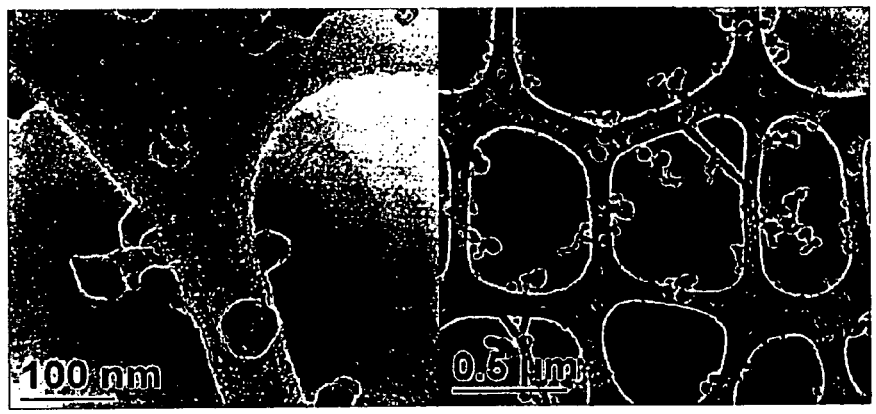
FIG. 6 is two TEM images of the filter samples with furnace inline.

The SMPS was used to determine the particle size distribution for smaller particle sizes. The vaporization condensation process was able to reliably and reproducibly generate a $C_{60}$ aerosol with a count median size of 36.6 nm. Table 3 summarizes the aerosol data for a 3 minute sampling period during the stable generation of aerosol, and FIG. 6 shows the particle number based distribution during a 3 minute sample.

TABLE 3

| | Num. Particle Size | Dia. Particle Size | Vol. Particle Size |
|---|---|---|---|
| Median (nm) | 59.1 | 67.3 | 85.4 |
| Mean (nm) | 62.1 | 70.6 | 94.8 |
| Geo. Mean (nm) | 58.0 | 66.3 | 86.3 |
| Mode (nm) | 62.6 | 67.3 | 89.8 |
| GSD | 1.45 | 1.43 | 1.49 |
| Total conc. | 4.66e05 (#/cm$^3$) | 28.9 (mm/cm$^3$) | 8.59e10 (nm$^3$/cm$^3$) |

Figure 7:
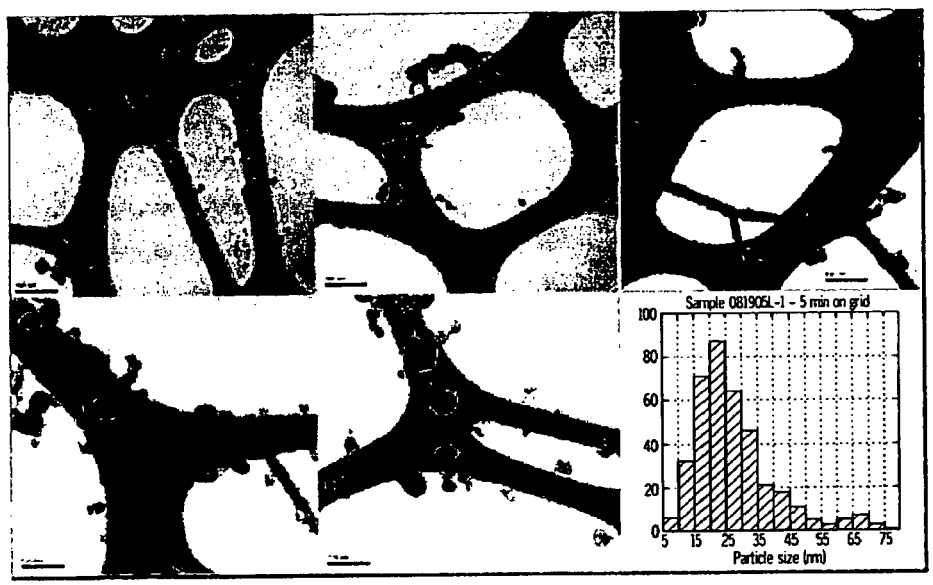
FIG. 7 is a histogram obtained using a Scion imaging software applied on TEM images.

SMPS analysis showed that more 99.7% of the total number of particles were less than 100 nm electrical mobility diameter. The TEM images of the samples were also taken. FIG. 7 shows the TEM images of the filter samples at two different resolutions.

Figure 8:
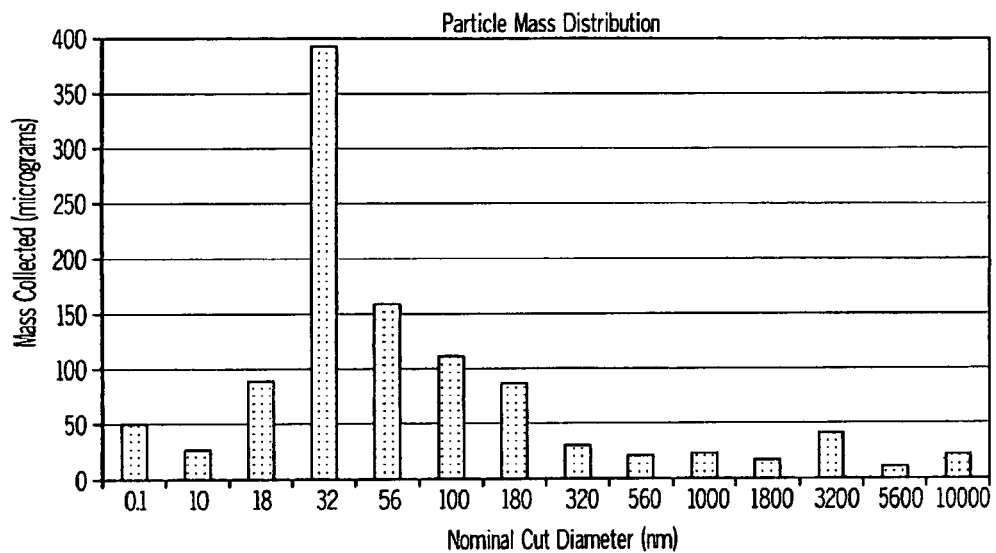
FIG. 8 is a graph showing the MOUDI mass distribution.

Five images of the grid were taken at 25K× magnification to provide sufficient particles for size analysis. These images were analyzed using a Scion Image imaging and analysis program (Gaithersburg, Md.). FIG. 8 shows the Kaleidagraph histogram obtained using this information. The mean particle size was observed to be ~24.6 nm.

The samples were also run through a MOUDI impactor to determine the mass size distribution. The MOUDI impactor has 13 stages with the cut points ranging from 10 μm to 10 nm. The rotation of the stages during sampling helped in uniform deposition of the test material on the filter. The MOUDI impactor and SMPS were placed at the same distance from the sampling port and both of these instruments sampled simultaneously for same duration of time.

The results obtained were compared to each other and the results were in good agreement with previous reported literature.

Figure 9:
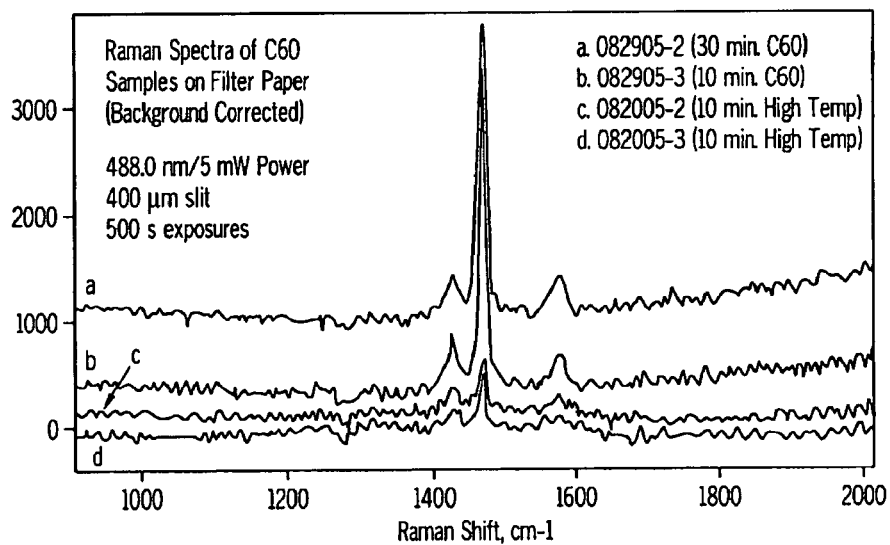
FIG. 9 is a graph showing the Raman spectrum at two different temperatures of the furnace tube.

FIG. 9 shows a MOUDI mass distribution obtained at ~10 LPM for a sample period of 20 minutes. The cumulative percent mass was plotted against nominal cut diameter of each stage and the MMAD was observed to be ~25 nm.

Figure 10:
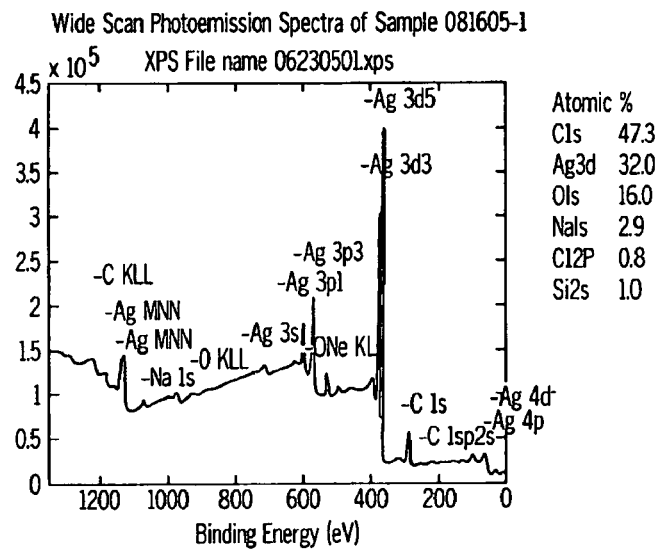
FIG. 10 is a graph showing the XPS Photoelectron Spectrum.

Tests were also performed to ensure the chemical purity of $C_{60}$ at the sampling port 22. There has been previously reported literature which suggests that $C_{60}$ decomposes into amorphous carbon when heated to high temperature FIG. 10 shows the Raman spectrum obtained for nano and micro sized $C_{60}$ aerosols. A spectrum for bulk $C_{60}$ powder is also shown on the same plot. The sample number 010906-2 represents the nano sized $C_{60}$ spectrum while sample number 010906-5 represents the spectrum for micro sized $C_{60}$ particles.

The high performance liquid chromatography (HPLC) analysis was carried on a regular basis to establish the chemical purity of $C_{60}$. The samples were collected on a Teflon filter which was analyzed gravimetrically and then dissolved in toluene to extract $C_{60}$. The HPLC analysis on this solution gave the mass of $C_{60}$ present on the filter. This mass was compared to the gravimetric mass to ensure there was nothing besides $C_{60}$ present in the sample. The results at furnace temperature of 600° C. and above showed the presence of something else besides $C_{60}$ present in the sample whereas at the furnace temperature of 500° C., the ratio of gravimetric mass to the HPLC determined $C_{60}$ mass was observed to be close to 1. FIG. 11 shows a typical HPLC spectrum obtained using $C_{60}$ standard and the filter sample collected.

The invention claimed is:

1. A furnace tube for generating nano particles comprising:
   a. a vaporization chamber, the vaporization chamber having an input end and an output end,
   b. a heating element in proximity to said furnace tube, the heating element capable of heating bulk materials contained within a gas flow in the vaporization chamber to a temperature sufficient to convert the bulk materials to a vapor phase,
   c. a dilution chamber having an input end, a cup receiver and an output end, the output end of the vaporization chamber in communication with the input end of the dilution chamber,
   d. wherein the cup receiver has a cup receiver outlet at the outlet end and wherein the dilution chamber further comprises a dilution gas port disposed at the outlet end of the dilution chamber that is separate from the outlet of the cup receiver.

2. The furnace tube of claim 1 wherein the vaporization chamber comprises bulk particles and an inert gas.

3. The furnace tube of claim 1 wherein the vaporization chamber comprises a bulk material selected from the group consisting of cerium oxide, carbon nanotubes, titanium dioxide, $C_{70}$, $C_{76}$, and $C_{84}$.

4. The furnace tube of claim 1 wherein the vaporization chamber comprises a bulk material selected from the group consisting of carbon nanotubes, $C_{70}$, $C_{76}$, $C_{84}$, and combinations thereof.

5. A furnace tube for generating nano particles wherein the dilution chamber further comprises buffer zones that isolate the interior of the furnace tube from the surrounding atmosphere.

6. The furnace tube of claim 1, consisting essentially of:
   a. a vaporization chamber, the vaporization chamber having an input end and an output end,
   b. a heating element in proximity to said furnace tube, the heating element capable of heating bulk materials contained within a gas flow in the vaporization chamber to a temperature sufficient to convert the bulk materials to a vapor phase,
   c. a dilution chamber having an input end, a cup receiver and an output end, the output end of the vaporization chamber in communication with the input end of the dilution chamber,
   d. wherein the cup receiver has a cup receiver outlet at the outlet end and wherein the dilution chamber further comprises a dilution gas port disposed at the outlet end of the dilution chamber that is separate from the outlet of the cup receiver.

* * * * *